United States Patent
Krebs et al.

(10) Patent No.: US 9,829,183 B2
(45) Date of Patent: Nov. 28, 2017

(54) PORTABLE COPYSTAND FOR ENHANCING INK/PARCHMENT CONTRAST

(71) Applicant: Franklin and Marshall College, Lancaster, PA (US)

(72) Inventors: J. Kenneth Krebs, Lancaster, PA (US); Shawn O'Bryhim, Lancaster, PA (US)

(73) Assignee: Franklin and Marshall College, Lancaster, PA (US)

( * ) Notice: Subject to any disclaimer, the term of this patent is extended or adjusted under 35 U.S.C. 154(b) by 87 days.

(21) Appl. No.: 14/525,885

(22) Filed: Oct. 28, 2014

(65) Prior Publication Data
US 2016/0113393 A1 Apr. 28, 2016

(51) Int. Cl.
| | |
|---|---|
| F21W 131/30 | (2006.01) |
| F21V 21/28 | (2006.01) |
| A45C 13/00 | (2006.01) |
| B43M 99/00 | (2010.01) |
| F16M 11/00 | (2006.01) |
| A45C 5/03 | (2006.01) |
| F21W 121/00 | (2006.01) |

(52) U.S. Cl.
CPC ........... *F21V 21/28* (2013.01); *A45C 5/03* (2013.01); *A45C 13/00* (2013.01); *A45C 13/005* (2013.01); *B43M 99/008* (2013.01); *F16M 11/00* (2013.01); *F21W 2121/00* (2013.01); *F21W 2131/3005* (2013.01)

(58) Field of Classification Search
USPC ........... 248/442.2, 447, 458, 460, 461, 462, 248/346.3, 346.01, 346.03, 346.06; 359/786, 630; 362/227, 234, 249.01, 362/249.07, 249.1
See application file for complete search history.

(56) References Cited

U.S. PATENT DOCUMENTS

| | | | |
|---|---|---|---|
| 4,290,093 A | 9/1981 | Thompson et al. | |
| 4,680,681 A * | 7/1987 | Fisherman | B42D 3/123 |
| | | | 281/19.1 |
| 4,963,986 A | 10/1990 | Fukuyama et al. | |
| 5,444,486 A | 8/1995 | Mizuno et al. | |
| 5,660,117 A * | 8/1997 | Noble | A47B 23/043 |
| | | | 108/35 |

(Continued)

FOREIGN PATENT DOCUMENTS

| | | |
|---|---|---|
| CN | 201001500 Y | 1/2008 |
| CN | 201547522 U | 8/2010 |

(Continued)

OTHER PUBLICATIONS

The Archimedes Palimpsest—I—Catalogue and Commentary, Edited by Reviel Netz, William Noel, Natalie Tchernetska and Nigel Wilson, Published for the Walters Art Museum by Cambridge University Press, first published 2011, Chapter 5, Imaging and Image-Processing Techniques, William A. Christens-Barry, Roger L. Easton, Jr., and Keith T. Knox, pp. 175-207.

(Continued)

*Primary Examiner* — Alfred Wujciak
(74) *Attorney, Agent, or Firm* — Barley Snyder

(57) ABSTRACT

A portable copystand is disclosed having a foldable base. A first adjustable arm and a second adjustable arm are provided. The portable copystand also has an ultraviolet light source and a visible spectrum light source.

24 Claims, 3 Drawing Sheets

(56) References Cited

U.S. PATENT DOCUMENTS

| | | | |
|---|---|---|---|
| 6,065,839 A | 5/2000 | Miyata et al. | |
| 6,488,698 B1 | 12/2002 | Hyman | |
| 7,394,978 B2 | 7/2008 | Sukenari et al. | |
| 7,549,762 B2 | 6/2009 | Dinnerstein et al. | |
| 7,626,634 B2 | 12/2009 | Ohki et al. | |
| D685,372 S | 7/2013 | Booppanon et al. | |
| 2003/0012013 A1 | 1/2003 | Herrera | |
| 2003/0025316 A1* | 2/2003 | Solomon | B41M 3/144 281/15.1 |
| 2006/0157630 A1* | 7/2006 | Buote | A47B 23/044 248/441.1 |
| 2010/0078928 A1* | 4/2010 | Mercieca | A47B 23/043 281/42 |
| 2011/0267807 A1 | 11/2011 | Nelson et al. | |
| 2012/0313500 A1* | 12/2012 | Breidenassel | F21K 9/135 313/46 |
| 2013/0114242 A1 | 5/2013 | Pickard et al. | |
| 2013/0208442 A1 | 8/2013 | Reiherzer | |

FOREIGN PATENT DOCUMENTS

| | | |
|---|---|---|
| CN | 201803117 U | 4/2011 |
| KR | 20060109796 A | 10/2006 |

OTHER PUBLICATIONS

Website print-out, www.mega-vision.com, Mega Vision Archival and Cultural Heritage Imaging, 5 pages, info@mega-vision.com.

* cited by examiner

PORTABLE COPYSTAND FOR ENHANCING INK/PARCHMENT CONTRAST

FIELD OF THE INVENTION

The invention is generally related to a copystand having a light source for enhancing ink and parchment contrast, and more specifically to a portable copystand having a light source for enhancing ink and parchment contrast.

BACKGROUND

During the Middle Ages, parchment prepared from animal hides was highly valued by ancient scholars for its durability, but was costly to produce. A common practice was to scrape the original text from the surface of existing parchment, and then write new text in the original text's place. Commonly known as palimpsest texts, these manuscripts have served as valuable sources of ancient texts thought to have been lost. Often the incomplete recycling techniques used at the time and the acidic nature of some inks left faint indelible impressions on the parchment. These impressions are often referred to as "underwriting" or "underlayment".

Early techniques by modern scholars to decipher the original text included simply reading the underwriting by eye, often under magnification. Later it was discovered that application of certain chemical reagents, such as hydrochloric acid, potassium cyanide or ammonium bisulfate, would make the underwriting text visible by chemically reacting with the ink used in the original text. However, use of these chemical techniques would often result in permanent damage to the parchment, and decomposition over time would render the palimpsest illegible.

Modern techniques now include the use of ultraviolet ("UV") light and digital photography to decipher underwriting, without damaging the manuscript. Ultraviolet light enhances the contrast between the ink and the parchment because iron gaul ink was widely used in ancient manuscripts, and iron absorbs UV light. The parchment also absorbs UV light, but then fluoresces in the blue spectral region. When a palimpsest manuscript is exposed to UV light, the residual iron from the underwriting ink absorbs the UV light, while the parchment fluoresces a bluish color. The dark underwriting ink with a bluish colored parchment background often provides an effective contrast whereby the original text in the underwriting can be deciphered.

Early UV enhancement of contrast involved the use of full spectrum UV mercury arc lamps. However, these lamps often resulted in a user experiencing severe "welder's blindness" from prolonged exposure to high doses of UV radiation, and the use of full spectrum UV gave uneven contrast between the iron gaul ink and the parchment. The use of narrow spectrum ranges of UV light reduce the likelihood of welder's blindness, and also provides a more consistent UV enhancement of contrast between the ink and the parchment.

While the use of UV light has become very popular for analyzing ancient manuscripts, a drawback is that current archival imaging systems are not portable. To use UV light, the manuscripts must by physically removed from their archival locations and transported to the location of the imaging systems. Additionally, the manuscript has to be carefully packaged and transported, so the risk of potential physical damage and exposure to harmful environmental changes is high. Understandably, curators are reluctant to allow scholars to remove the manuscripts for UV imaging. Further, the cost of transportation and the cost of the commercial imaging systems is very high, precluding many individuals and scholars from using UV light to analyzing ancient manuscripts for underwriting.

Therefore, there is a need for a portable copystand having a UV light source that an individual can easily transport to an archival location and take digital images of UV light enhanced manuscripts.

SUMMARY

A portable copystand according to the invention has a foldable base. A first adjustable arm and a second adjustable arm are provided. The portable copystand also has an ultraviolet light source and a visible spectrum light source.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
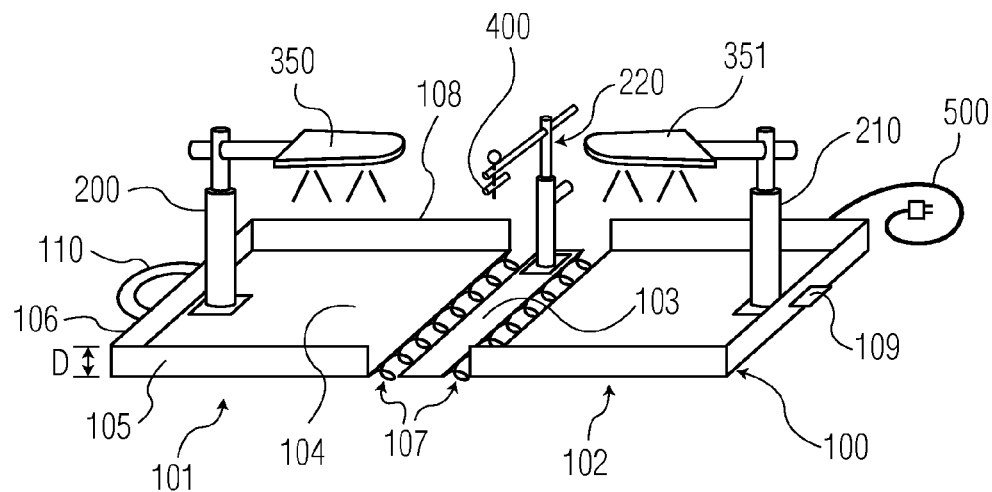
FIG. 1 is a perspective view of a portable copystand.

Exemplary embodiments of the invention will now be described with reference to the accompanying FIGS. 1-8.

A portable copystand is disclosed having a foldable base 100, a first adjustable arm 200, a second adjustable arm 210, a third adjustable arm 220, an ultraviolet light source 300, a visible spectrum light source 310, a camera connector 400, and a power supply member 500.

Figure 2:
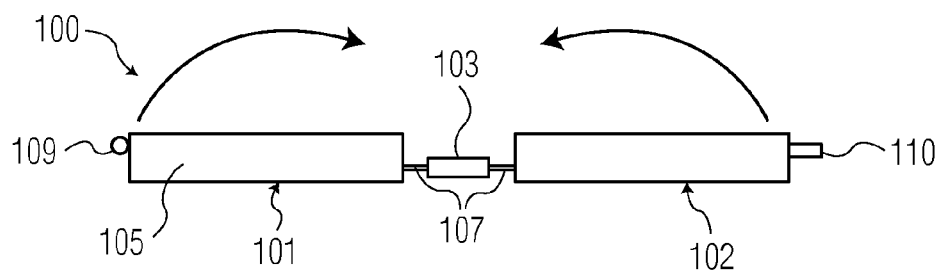
FIG. 2 is a side view of a first base member, second base member, and spine of the portable copystand.
Figure 3:
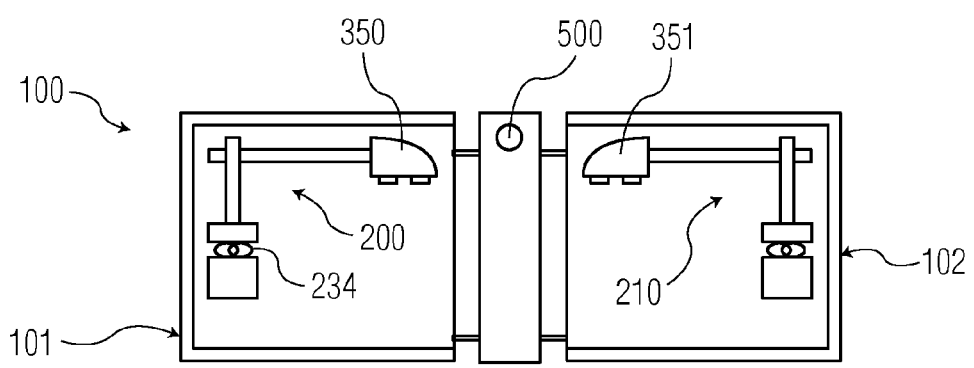
FIG. 3 is a top view of the portable copystand with a first and second light source assembly hingedly folded into the first and second base members shown in FIG. 2.

The foldable base 100 includes a first base member 101, a second base member 102, a spine 103, and a pair of first hinges 107. As illustrated in FIGS. 1-3, the first base member 101 has a support member 104, a first sidewall 105, a second sidewall 106, and a third sidewall 108. The second base member 102 is similar in structure and dimension to, and complementary to the first base member 101. In an exemplary embodiment, the foldable base 100 includes a fastening mechanism 109. In another exemplary embodiment, the foldable base 100 includes a handle 110.

Figure 7:
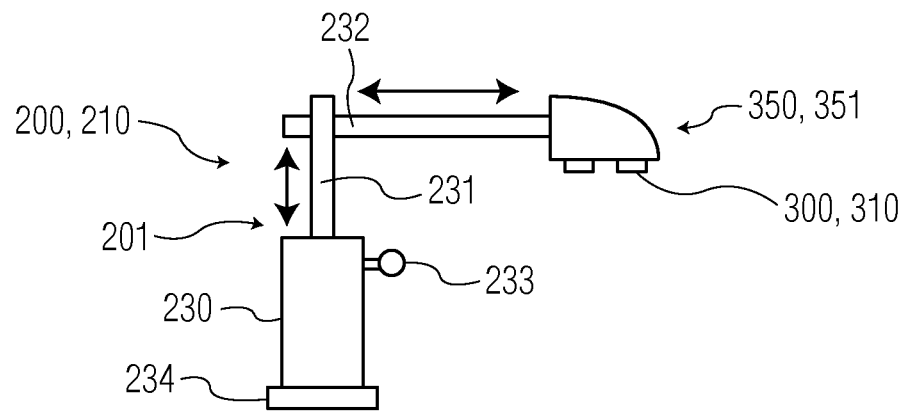
FIG. 7 is a perspective view of an adjustable arm with the light source assembly.

In an exemplary embodiment shown in FIG. 7, the first adjustable arm 200 includes a vertical telescopic column 201, a horizontal positioning arm 232, and a hinged base 234. The vertical telescopic column 201 includes an outer sleeve 230, an inner arm 231, and a clamping mechanism 233. In the exemplary embodiment, the first adjustable arm 200 includes a horizontal positioning arm 232 extending continuously from the inner arm 231 to form a single arm having a bent shape with a substantially right angle. A first light source assembly 350 is attached to an end of the horizontal positioning arm 232 on the first adjustable arm 200, and a second light source assembly 352 is attached to an end of the horizontal positioning arm 232 on the second adjustable arm 210. As discussed in detail below, the first and second light source assemblies 350, 351 are substantially similar in structure.

Figure 6:
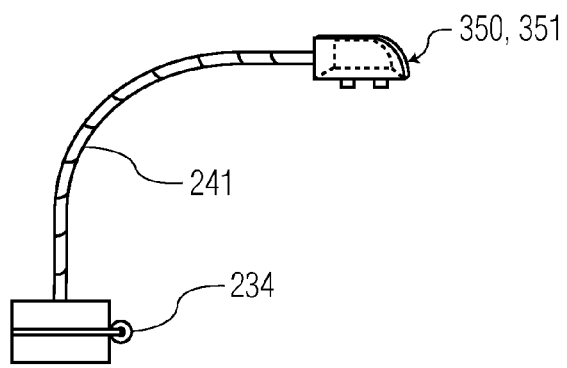
FIG. 6 is a side view of a flexible arm having the light source assembly connected at an end.

In a second exemplary embodiment shown in FIG. 6, the first adjustable arm 200 includes a flexible and continuous arm member 241 and a hinged base 234. The hinged base 234 can be attached to either the first or second base members 101,102.

In an exemplary embodiment shown in FIG. 7, the first adjustable arm 200 and the second adjustable arm 210 are substantially identical in structure. In the exemplary embodiment shown in FIG. 4, the third adjustable arm 220 is substantially identical in structure to the first and second adjustable arms 200, 210, except that the third adjustable arm 220 includes the camera connector 400 on an end of the horizontal positioning arm 232 rather than the light source assemblies 350, 351. In another exemplary embodiment, shown in FIG. 8, the third adjustable arm 220 is substantially identical in structure to the first and second adjustable arms 200, 210, except that the third adjustable arm 220 includes a threaded end portion 401 on an end of the horizontal positioning arm 232. Both the camera connector 400 and the threaded end portion 401 are releasably connectable to a camera (not shown).

In another exemplary embodiment, the adjustable arms 200, 210 can be any combination of the adjustable arm embodiments shown in FIGS. 6 and 7. For example, both adjustable arms 200, 210 can be the same structure shown in FIG. 6 or 7, or one adjustable arm can be the structure shown in FIG. 6 while the other adjustable arm can be the structure shown in FIG. 7. In an exemplary embodiment the third adjustable arm 220 can have the structures shown in FIG. 4 or 8, or can have the structure shown in FIG. 6, where the light source assembly 350,351 has been replaced with the camera connector 400 or the threaded end portion 401.

The ultraviolet light source 300 is a light emitting diode that emits light in the ultraviolet spectrum. The ultraviolet spectrum as known by those of ordinary skill in the art to include a wavelength range of approximately 100-400 nm. In an exemplary embodiment, the ultraviolet light source emits a wavelength range of approximately 300-400 nm. In another exemplary embodiment, the ultraviolet light source 300 emits a wavelength range of approximately 350-400 nm. In yet another embodiment, the ultraviolet light source emits a wavelength range of approximately 375-385 nm.

The visible spectrum light source 310 is a light emitting diode that emits light visible to the human eye. Those of ordinary skill in the art would understand that visible light includes a wavelength of approximately 400 nm to 700 nm.

The power supply member 500 supplies power to the ultraviolet light source 300 and the visible spectrum light source 310. The power supply member 500 may include the use of batteries, or the use of an external power source. A conventional adjustable switch (not shown) may be included with the power supply member 500 for adjusting the intensity of the light sources 300,310.

Assembly of the major components will now be described in detail.

The support members 104 of the first base member 101 and the second base member 102 serve as a foundation upon which a manuscript or book is placed. As shown in the embodiments illustrated in FIGS. 1-3, each support member 104 is substantially planar, and has four edges. The first sidewall 105 is positioned along the length of a first edge of the support member 104, and extends perpendicular away from an inside surface of the support member 104 for a distance D. The second sidewall 106 is positioned along the length of a second edge of the support member 104, and extends perpendicular away from the inside surface of the support member 104 for a distance D. The first sidewall 105 and the second sidewall 106 connect at an approximate ninety degree angle to form a corner. The third sidewall 108 is positioned along the length of a third edge of the support member 104, and extends perpendicular away from the inside surface of the support member 104 for a distance D. The second sidewall 106 and the third sidewall 108 connect at an approximate ninety degree angle to form a corner. The third edge is along an end opposite from an end having the first edge, and perpendicular to the second edge and fourth edge. A fourth edge of the support member 104 is along an end opposite an end having the second edge, and perpendicular to the first edge and third edge.

The spine 103 has a length substantially equal to the length of the fourth edge of the support member 104. The fourth edge of the first base member 101 and the fourth edge of the second base member 102 are connected to opposing longitudinal edges of the spine 103 through the pair of first hinges 107. In an exemplary embodiment, the pair of first hinges 107 extend along the length of the longitudinal edges of the spine 103. However, one of ordinary skill in the art would appreciate that a plurality of hinges can also be used, such as having two hinges positioned along each longitudinal edge of the spine 103, or three or more hinges positioned along each longitudinal edge of the spine 103.

The width of the spine 103 is approximately twice the distance D, such that when the first base member 101 and the second base member 102 are folded together, their combined width is approximately equal to the width of the spine 103. When the first base member 101 and the second base member 102 are folded together, the inner surfaces of the respective support members 104 face each other, and the corresponding first, second, and third sidewalls 105,106,108 contact each other along their respective top edges to form a briefcase or suitcase-like structure.

The fastening mechanism 109 serves to fasten the first base member 101 to the second base member 102 when the first and second base members 101,102 are folded together for transport or storage. The fastening mechanism 109 may be positioned on the outside surface of the first sidewall 105. In an exemplary embodiment, the fastening mechanism 109 includes a latch on one of the first sidewalls 105 and a corresponding catch on the other first sidewalls 105. (not shown) In other embodiments, the fastening mechanism 109 is positioned on the second sidewall 106 (See FIG. 1) or the third sidewall 108, or a plurality of fastening mechanisms 109 may be placed on a combination of first, second, and third sidewalls 105,106,108. In other exemplary embodiments, the fastening mechanism 109 is a hook and eyelet system, a key activated lock, or any other common fastening mechanism known to those of ordinary skill in the art.

The handle 110 may be attached to the first base member 101 or the second base member 102. The handle 110 may be hingedly attached or rigidly attached to the first or second base members 101,102. In one exemplary embodiment, the handle 110 is attached to the second sidewall 106 of the first or second base member 101,102. In other exemplary embodiments, the handle 110 is attached to the first sidewall 105 or the third sidewall 108 of the first or second base member 101,102.

The vertical telescopic column 201 is illustrated in FIGS. 1, 4, 7, and 8. A portion of the inner arm 231 is positioned partially inside the outer sleeve 230. The inner arm 231 is axially rotatable with respect to the outer sleeve 230 and can slide in and out of the outer sleeve 230 along the longitudinal axis of the vertical telescopic column 201. Therefore, the vertical telescopic column 201 can be varied in length, and can rotate around the longitudinal axis with appropriate friction.

The clamping mechanism 233 includes a tightening screw 233 passing through a threaded hole (not shown) in the outer sleeve. An end of the tightening screw 233 is contactable with the inner arm 231 and can apply a frictional force sufficient to reversibly immobilize the inner arm 231 and fix the length of the vertical telescopic column 20. Other exemplary embodiments of the clamping mechanism 233 include other common clamping mechanisms know to those of ordinary skill in art, such as a locking outer sleeve (not shown) engageable with threads disposed on an outer surface of the outer sleeve 230, and having a locking ring that clamps down on the inner arm 231 when the locking outer sleeve engages with the threads.

The horizontal positioning arm 232 is connected to the vertical telescopic column 201 at an end of the inner arm 231, and extends orthogonal to the vertical telescopic column 201. A 90° clamp (not shown) may be used to connect the horizontal positioning arm 232 to the inner arm 231. The horizontal positioning arm 232 is slidably adjustable with respect to the vertical telescopic column 201, along an axis perpendicular to that of the inner arm 231. A second clamping mechanism (not shown) similar to the clamping mechanism 233 may be positioned on the inner arm to apply a frictional force sufficient to reversibly immobilize the horizontal positioning arm 232.

The hinged base 234 of the first adjustable arm 200 and the second adjustable arm 210 is disposed on an end of the outer sleeve 230 and attaches to the inner surface of support members 104 near the second edge of the first base member 101 and the second base member 102. The hinged base 234 permits the adjustable arms 200, 210 to be folded horizontally against the inner surface of the support member 104 during traveling or storage, and subsequently be raised to a vertical position. See FIG. 3.

In an exemplary embodiment, the third adjustable arm 220 is essentially structurally identical to the first and second adjustable arms 200,210, and the hinged base 234 attaches to an inner surface of the spine 103. The hinged base 234 permits the third adjustable arm 220 to be folded horizontally against the inner surface of the spine 103 during traveling or storage, and subsequently be raised to a vertical position. (not shown) In another exemplary embodiment, the third adjustable arm 220 is removably connected to the spine 103, by insertion of the base of the vertical telescopic column 201 into a receiving space 500 positioned on the spine 103. See FIG. 3. In yet another exemplary embodiment, the base of the vertical telescopic column 201 is rigidly fixed to the spine 103. See FIG. 1.

In other exemplary embodiments, the first, second, and third adjustable arms 200,210,220 are removably connected to the foldable base 100, and can be detached and placed within the foldable base 100 for traveling or storing. (not shown)

Figure 4:
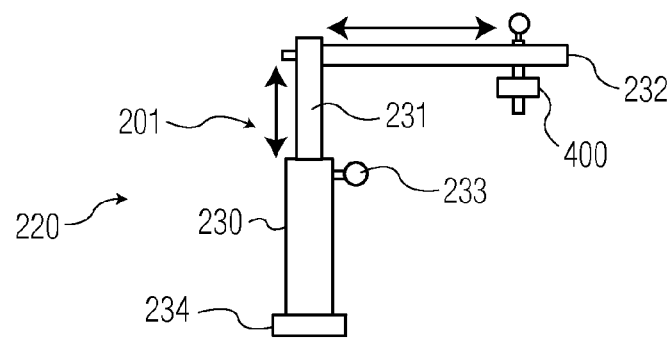
FIG. 4 is a perspective view of an adjustable arm having a camera connector.
Figure 5:
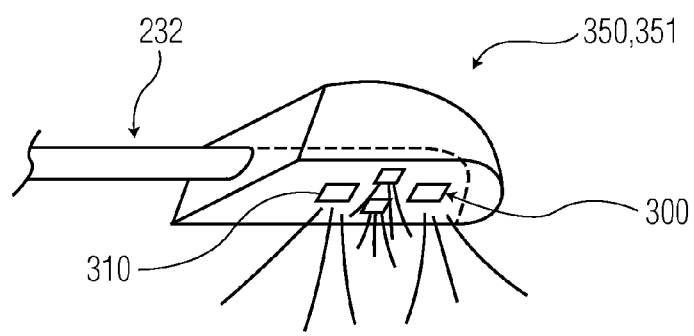
FIG. 5 is a perspective view of a light source assembly.

In an embodiment shown in FIG. 4, the camera connector 400 removably connects to commercially available cameras (not shown), and is connected to an end of the horizontal positioning arm 232 of the third adjustable arm 220. The camera connector 400 is slidably connected to the horizontal positioning arm 232 by a clamp, such that the position of an attached camera can be adjusted along the length of the horizontal position arm 232 to be positionable over a manuscript or document resting on the inner surface of the support members 104.

Figure 8:
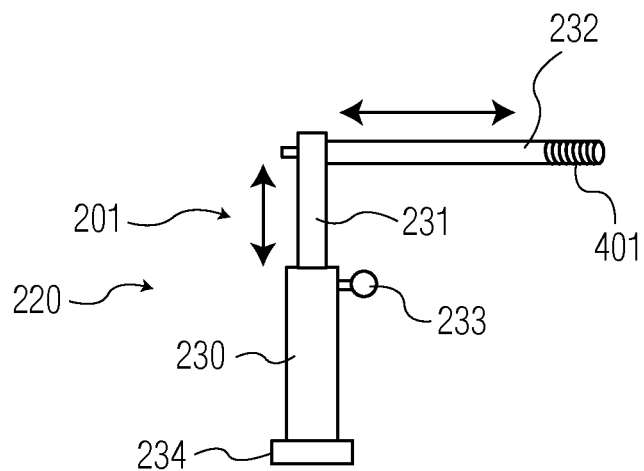
FIG. 8 is a perspective view of the adjustable arm in FIG. 4 with a threaded end.

In another embodiment shown in FIG. 8, the horizontal positioning arm 232 has a threaded end portion 401 that removably connects to the camera (not shown). Since the horizontal positioning arm 232 is slidably adjustable with respect to the vertical telescopic column 201, the position of the attached camera (not shown) can be adjusted to be directly over a manuscript or document resting on the inner surface of the support members 104.

The ultraviolet light source 300 and the visible light source 310 are positioned in a first light source assembly 350 and a second light source assembly 351. The light source assemblies 350, 351 are connected to an end of the horizontal positioning arm 232 on the first adjustable arm 200 and on the second adjustable arm 210, respectively. See FIGS. 1 and 5-7. The height of the adjustable arms 200,210 can be adjusted with respect to the support member 104 such that the light source assembly 350 can be positioned approximately above a manuscript being examined, at varying distances to optimize the UV contrast between the ink and the parchment. In the exemplary embodiment shown in FIG. 6, the light source assemblies 350, 351 are connected to an end of the continuous arm member 241.

In an exemplary embodiment, 1, 2, 3, 4, or more ultraviolet light sources 300 are positioned in each of the light source assemblies 350, 351. In another exemplary embodiment, 1, 2, 3, 4, or more visible light sources 310 are positioned in each of the light source assemblies 350, 351. In yet another exemplary embodiment, a combination of 6, 8, 10 or more ultraviolet light sources 300 and visible light sources 310 are positioned in each of the light source assemblies 350,351. The intensity of the ultraviolet light sources 300 and the visible light sources 310 can be adjustable to capture workable images. The positioning of the light sources 300, 310 can be in any combination of rows, such as one row of ultraviolet light sources 300 and one row of visible light sources 310. Additionally, the positioning of the light sources 300, 310 can included two or more rows of the ultraviolet light sources 300, and two or more rows of the visible light sources 310. Other positioning configurations can also be used, so long as the light sources 300,310 provide an even exposure across the entire surface of the foldable base 100.

The light source assemblies 350,351 are connected to the power supply member 500. If the power supply is DC supplied from batteries, the batteries may be positioned in the light source assemblies 350, 351, or may be remotely attached to the first base member 101, or the second base member 102, on both base members 101,102, or may be housed separate from the base members 101,102 in a convention configuration well known to those of ordinary skill in the art (not shown). Alternative, the light source assemblies may be connected to an external power source by a plug (See FIG. 1).

What is claimed is:

1. A portable copystand for enhancing ink/parchment contrast, comprising:
    a foldable base;
    a first adjustable arm connected to the foldable base;
    a second adjustable arm connected to the foldable base;
    an ultraviolet light source positioned on both the first adjustable arm and the second adjustable arm; and
    a visible spectrum light source positioned on both the first adjustable arm and the second adjustable arm.

2. The portable copystand of claim 1, wherein the foldable base comprises:
    a first base member;
    a second base member; and a spine.

3. The portable copystand of claim 2, wherein the foldable base further comprises:
   a first hinge connected to the first member and the spine; and
   a second hinge connected to the second member and the spine.

4. The portable copystand of claim 2, wherein the first adjustable arm is connected to the first base member.

5. The portable copystand of claim 4, wherein the first adjustable arm is hingeably connected to the first base member.

6. The portable copystand of claim 2, wherein the second adjustable arm is connected to the second base member.

7. The portable copystand of claim 6, wherein the second adjustable arm is hingeably connected to the second base member.

8. The portable copystand of claim 2, wherein the first adjustable arm is foldable into the first base member.

9. The portable copystand of claim 2, wherein the second adjustable arm is foldable into the second base member.

10. The portable copystand of claim 1, wherein the lengths of the first adjustable arm and the second adjustable arm are longitudinally adjustable.

11. The portable copystand of claim 1, wherein the ultraviolet light source is positioned on the first adjustable arm or the second adjustable arm, or on both the first and second adjustable arms.

12. The portable copystand of claim 1, wherein the visible spectrum light source is positioned on the first adjustable arm or the second adjustable arm, or on both the first and second adjustable arms.

13. The portable copystand of claim 1, wherein the ultraviolet light source and the visible spectrum light source are light emitting diodes.

14. The portable copystand of claim 1, further comprising a third adjustable arm.

15. The portable copystand of claim 14, wherein the third adjustable arm is connected to the a spine.

16. The portable copystand of claim 15, wherein the third adjustable arm is hingeably connected to the spine.

17. The portable copystand of claim 14, wherein the third adjustable arm is foldable onto the spine.

18. The portable copystand of claim 14, wherein the length of the third adjustable arm is longitudinally adjustable.

19. The portable copystand of claim 14, further comprising a camera connector positioned on an end of the third adjustable arm.

20. The portable copystand of claim 1, further comprising a power supply member.

21. A portable copystand for enhancing ink/parchment contrast, comprising:
    a foldable base;
    a first adjustable arm connected to the foldable base;
    a second adjustable arm connected to the foldable base;
    a third adjustable arm connected to a spine;
    an ultraviolet light source positioned on either the first adjustable arm or the second adjustable arm; and
    a visible spectrum light source positioned on either the first adjustable arm or the second adjustable arm.

22. The portable copystand of claim 21, wherein the third adjustable arm is hingeably connected to the spine.

23. A portable copystand for enhancing ink/parchment contrast, comprising:
    a foldable base;
    a first adjustable arm connected to the foldable base;
    a second adjustable arm connected to the foldable base;
    a third adjustable arm connected to the foldable base, a length of the third adjustable arm is longitudinally adjustable;
    an ultraviolet light source positioned on either the first adjustable arm or the second adjustable arm; and
    a visible spectrum light source positioned on either the first adjustable arm or the second adjustable arm.

24. A portable copystand for enhancing ink/parchment contrast, comprising:
    a foldable base;
    a first adjustable arm connected to the foldable base;
    a second adjustable arm connected to the foldable base;
    a third adjustable arm connected to the foldable base;
    a camera connector positioned on an end of the third adjustable arm;
    an ultraviolet light source positioned on either the first adjustable arm or the second adjustable arm; and
    a visible spectrum light source positioned on either the first adjustable arm or the second adjustable arm.

* * * * *